(12) United States Patent
Stone

(10) Patent No.: US 8,800,488 B2
(45) Date of Patent: Aug. 12, 2014

(54) INTERNET CONTROLLED PET FEEDER

(71) Applicant: Alex Jon Stone, Marina Del Rey, CA (US)

(72) Inventor: Alex Jon Stone, Marina Del Rey, CA (US)

( * ) Notice: Subject to any disclaimer, the term of this patent is extended or adjusted under 35 U.S.C. 154(b) by 0 days.

(21) Appl. No.: 13/949,117

(22) Filed: Jul. 23, 2013

(65) Prior Publication Data

US 2014/0090601 A1    Apr. 3, 2014

Related U.S. Application Data

(60) Provisional application No. 61/744,687, filed on Oct. 2, 2012.

(51) Int. Cl.
*A01K 5/02*    (2006.01)

(52) U.S. Cl.
CPC .......................................... *A01K 5/02* (2013.01)
USPC ..................................... 119/51.01; 119/51.12

(58) Field of Classification Search
CPC .. A01K 5/0291; A01K 5/0275; A01K 5/0114
USPC ................. 119/51.01, 51.02, 51.12, 57, 57.4, 119/61.53
See application file for complete search history.

(56) References Cited

U.S. PATENT DOCUMENTS

| | | | | |
|---|---|---|---|---|
| 2,528,742 | A * | 11/1950 | Coffing | 119/51.12 |
| 4,248,175 | A * | 2/1981 | Navarro | 119/51.12 |
| 4,249,483 | A * | 2/1981 | Sobky | 119/51.12 |
| 4,421,059 | A * | 12/1983 | Cousino | 119/51.12 |
| 4,473,031 | A * | 9/1984 | Bobeczko | 119/51.12 |
| 4,617,874 | A * | 10/1986 | Zammarano | 119/51.12 |
| 4,671,210 | A * | 6/1987 | Robinson et al. | 119/51.12 |
| 5,176,103 | A * | 1/1993 | Reid et al. | 119/51.13 |
| 5,222,461 | A * | 6/1993 | Haynes | 119/62 |
| D339,429 | S * | 9/1993 | Reid et al. | D30/121 |
| 5,265,560 | A * | 11/1993 | Dobbins | 119/51.12 |
| 5,377,620 | A * | 1/1995 | Phillippi | 119/51.12 |
| 5,975,024 | A * | 11/1999 | Sheaffer | 119/477 |
| 6,349,671 | B1 * | 2/2002 | Lewis et al. | 119/51.02 |
| 6,766,766 | B1 * | 7/2004 | Elliott | 119/57.92 |
| 7,650,855 | B2 * | 1/2010 | Krishnamurthy | 119/51.11 |
| D681,886 | S * | 5/2013 | Paschall et al. | D30/129 |
| 2008/0289580 | A1* | 11/2008 | Krishnamurthy | 119/51.11 |
| 2012/0204799 | A1* | 8/2012 | Desrosiers | 119/61.54 |

* cited by examiner

*Primary Examiner* — Yvonne Abbott
(74) *Attorney, Agent, or Firm* — Zuber Lawler & Del Duce LLP

(57) ABSTRACT

The invention provides remotely programmable, automated, multi-meal pet feeding apparatuses for use by pet owners and caretakers. Such apparatuses may include a communications module for connection to a communications network such as the Internet. The apparatuses may also include a built-in webcam to monitor a pet's feeding activity and environment.

24 Claims, 13 Drawing Sheets

INTERNET CONTROLLED PET FEEDER

CROSS-REFERENCE TO RELATED APPLICATIONS

This application claims the benefit of U.S. provisional patent application Ser. No. 61/744,687 filed Oct. 2, 2012, which is hereby incorporated by reference in its entirety.

FIELD OF THE INVENTION

The present invention relates to the field of automated pet feeders.

BACKGROUND OF THE INVENTION

Conventional automated pet feeders are typically controlled via a timer that forms a part of the pet feeder. They are inflexible to the needs of pet owners as the set schedule cannot be changed unless the pet owner is physically present at the pet feeder device. Further, it is not possible for pet owners to view their pets when they are away from home. Further still, it is not possible for pet owners to know that their pets are actually eating when they are supposed to.

What is needed and provided by the present invention, is a web-connected, remotely programmable, automated pet feeding apparatus having advanced monitoring capabilities.

SUMMARY OF THE INVENTION

One embodiment of the invention provides a multi-meal, automated pet feeding apparatus that includes:

a housing including a bottom, a vertically extending side wall or walls and a top, wherein a feeding aperture is formed in the top; and a feeding turntable including a plurality of circumferentially adjacent, radially disposed, horizontally expansive food compartments each bounded by a bottom surface and side walls and open at its top, the turntable rotatably mounted and rotatable within the horizontal dimension of the housing, wherein the feeding aperture and the food compartments are mutually sized and configured so that the feeding aperture provides access to only a single underlying food compartment at one time.

A related embodiment of the invention provides a multi-meal, automated pet feeding apparatus that includes:

a lower housing (or "tub" portion) forming a partial enclosure including a bottom and a vertically extending side wall or walls, with a top aperture formed therein that opens into the interior of the lower housing;

a feeding turntable including a plurality of circumferentially adjacent, radially disposed, horizontally expansive food compartments each bounded by a bottom surface and side walls and open at its top, the turntable rotatably mounted and rotatable within the horizontal dimension of the lower housing;

a reversibly closable horizontally expansive top cover having an outward-facing top surface and an inward-facing bottom surface and a feeding aperture formed therein, wherein the top cover and the lower housing are mutually sized and configured so that when the top cover is closed it covers the top aperture formed in the lower housing except for the portion of said top aperture that is below the feeding aperture of the top cover, and wherein the feeding aperture and the food compartments are mutually sized and configured so that the feeding aperture is capable of providing access to only a single underlying food compartment at one time.

The pet feeding apparatuses may further include:
a processor;
processor-accessible memory;
processor-implementable computer instructions stored in the processor-accessible memory;
a motorized mechanism configured to rotate the feeding turntable,
wherein operation of the motorized mechanism to rotate the feeding turntable is under control of the processor, and
wherein the computer instructions are configured to direct the processor to operate the motorized mechanism to rotate the turntable at preprogrammed time intervals or times to position different feeding compartments under the feeding aperture of the top cover in its closed position at the programmed time intervals or times.

The apparatuses may further include a communications module to connect with a communication network, such as the Internet, so that pet owners can remotely program and control the apparatus. The apparatuses may further include a built-in digital camera, such as a web cam, that allows pet owners to view their pets by receiving transmitted still images and/or video transmitted by the apparatus.

DETAILED DESCRIPTION OF THE INVENTION

Figure 1:
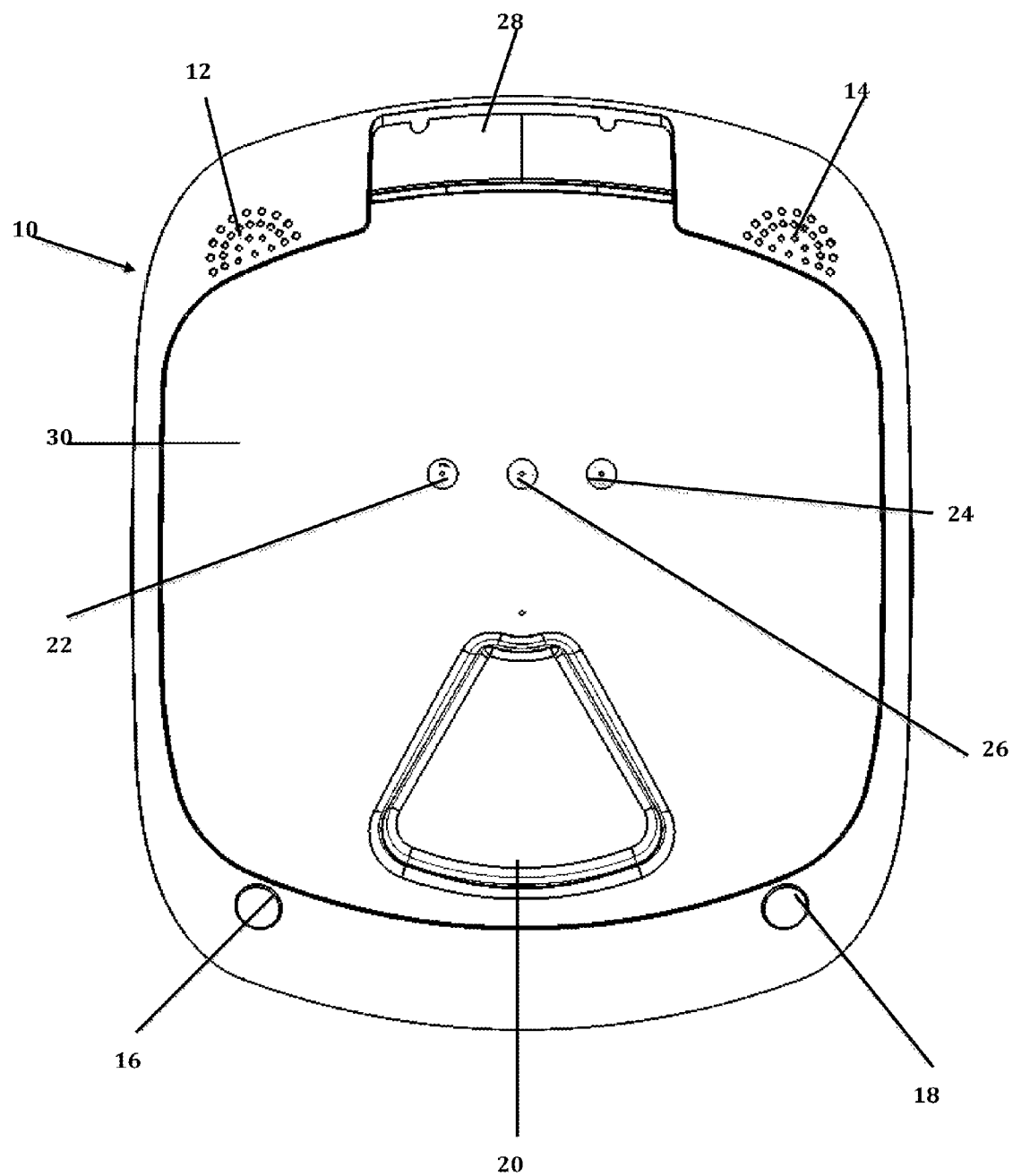
FIG. 1. is a top view of a feeder embodiment of the present invention with its cover in the closed position.

In one aspect, the invention provides automated, multi-meal pet feeding apparatuses for use by pet owners and caretakers. Such apparatuses may include a communications module for connection to a communications network, such as the Internet, so that functions of the pet feeder, such as feeding times, can be programmed or otherwise controlled from a remote location. The apparatuses may also include a built-in digital camera with or without a microphone so that a pet's feeding activity and environment can be monitored remotely.

One embodiment of the invention provides a multi-meal, automated pet feeding apparatus that includes:

a housing including a bottom, a vertically extending side wall or walls and a top, wherein a feeding aperture is formed in the top; and a feeding turntable including a plurality of circumferentially adjacent, radially disposed, horizontally expansive food compartments each bounded by a bottom surface and side walls and open at its top, the turntable rotatably mounted and rotatable within the horizontal dimension of the housing, wherein the feeding aperture and the food compartments are mutually sized and configured so that the feeding aperture provides access to only a single underlying food compartment at one time.

A related embodiment of the invention provides a multi-meal, automated pet feeding apparatus that includes:

a lower housing (or "tub" portion) forming a partial enclosure including a bottom and a vertically extending side wall or walls, with a top aperture formed that opens into the interior of the lower housing;

a feeding turntable including a plurality of circumferentially adjacent, radially disposed, horizontally expansive food compartments each bounded by a bottom surface and side walls and open at its top, the turntable rotatably mounted and rotatable within the horizontal dimension of the lower housing;

a reversibly closable horizontally expansive top cover having an outward-facing top surface and an inward-facing bottom surface and a feeding aperture formed therein, wherein the top cover and the lower housing are mutually sized and configured so that when the top cover is closed it covers the top aperture formed in the lower housing except for the portion of said top aperture that is below the feeding aperture of the top cover, and wherein the feeding aperture and the food compartments are mutually sized and configured so that the feeding aperture is capable of providing access to only a single underlying food compartment at one time. The top cover may be hingeably attached to the lower housing. Aside from the feeding aperture, when the top cover is in its closed position, there are no unobstructed apertures of sufficient size to permit the pet, e.g., dog or cat, to access the interior space of the apparatus.

The turntable may be progressively advanced at preset times or time intervals to sequentially bring food compartments beneath the feeding aperture to permit a pet feeding access to the contents of the underlying food compartment. The apparatus may include a motorized mechanism configured to rotate the feeding turntable. The size and shape of the horizontal profile of the feeding aperture may be at least substantially the same as the size and shape of each of the horizontal profiles of the food compartments. In this manner, the horizontal dimension of the feeing aperture and the top aperture of a feeding compartment immediately below can line-up in a coextensive manner.

The food compartments of the feeding turntable and the top cover of the apparatus may be mutually sized and configured to at least substantially seal or isolate the food compartment presently underlying the feeding aperture from the other interior contents (including the other food compartments) of the lower housing. In one variation, the feeding aperture may be bounded by downward-extending side walls having bottom edges, that are part of or integrated with the top cover, with the lower housing, feeding turntable and top cover being mutually sized and configured so that when the top cover is closed, the top edges of the side walls of the immediately underlying food compartment are in close proximity to the bottom edges of the downward-extending side walls. In another variation, the feeding aperture may be bounded by downward-extending side walls having bottom edges, that are part of or integrated with the top cover, with the lower housing, feeding turntable and top cover being mutually sized and configured so that when the top cover is closed, the top edges of the side walls of the immediately underlying food compartment are in slideable contact with the bottom edges of the downward-extending side walls The horizontal dimension of the top aperture of the lower housing may be larger than the horizontal dimension of the feeding turntable. This facilitates access to and cleaning of the turntable when the top cover is in an open position. The turntable may also be removable from the lower housing.

The feeding apparatus may include and be under the control of electronic circuitry such as one or more microprocessors and microcontrollers. The pet feeding apparatus may include:

a processor;

processor-accessible memory; and processor-implementable computer instructions stored in the processor-accessible memory, wherein operation of the motorized mechanism to rotate the turntable is under control of the processor, and wherein the computer instructions are configured to direct the processor to operate the motorized mechanism to rotate the turntable at preprogrammed time intervals or times to position different feeding compartments under the feeding aperture of the top cover in its closed position at the programmed time intervals or times.

The pet feeding apparatus may further include: a communications module operably linked to the processor, wherein the computer instructions are further configured to direct the processor to receive, store and implement, time programming (scheduling) instructions for operation of the turntable that are received via the communications module. The communications module may be or include a wireless communications module, such as a Wi-Fi communications module and/or a cellular telephone network communications module. The pet feeding apparatus may include an Ethernet port connection and/or USB port for wired access to an Internet router or LAN.

The pet feeding apparatus may include an outward-viewing digital camera operably linked to the processor, wherein the computer instructions are further configured to direct the processor to transmit digital images obtained using the digital camera via the communications module to a remote recipient such as the pet owner. The digital camera may be integrated with the top cover of the pet feeding apparatus. The pet feeding apparatus may similarly include a microphone operably linked to the processor, wherein the computer instructions are further configured to direct the processor to transmit audio data obtained using the microphone to a remote recipient via the communications module. The pet feeding apparatus may include both a digital camera and microphone, for example, as a single webcam unit, for transmitting video and/or still images, with audio, to a remote recipient via the communications module.

The pet feeding apparatus may include: one or more speakers operably linked to the processor, wherein the computer instructions are further configured to direct the processor to operate the one or more speakers to play an audio segment recorded in the processor-accessible memory. The audio segment may, for example, be automatically played at times of feeding and/or at preprogrammed time intervals or times. The apparatus may further include a microphone, with the computer instructions further configured to direct the processor to store an audio segment obtained using the microphone in the processor accessible memory and thereafter operate the one or more speakers to play the recorded audio segment.

The feeding apparatus may include one or more speakers operably linked to the processor, with the computer instructions further configured to direct the processor to operate the one or more speakers to play at least substantially real-time audio received from a remote user via the communications module.

Figure 13:
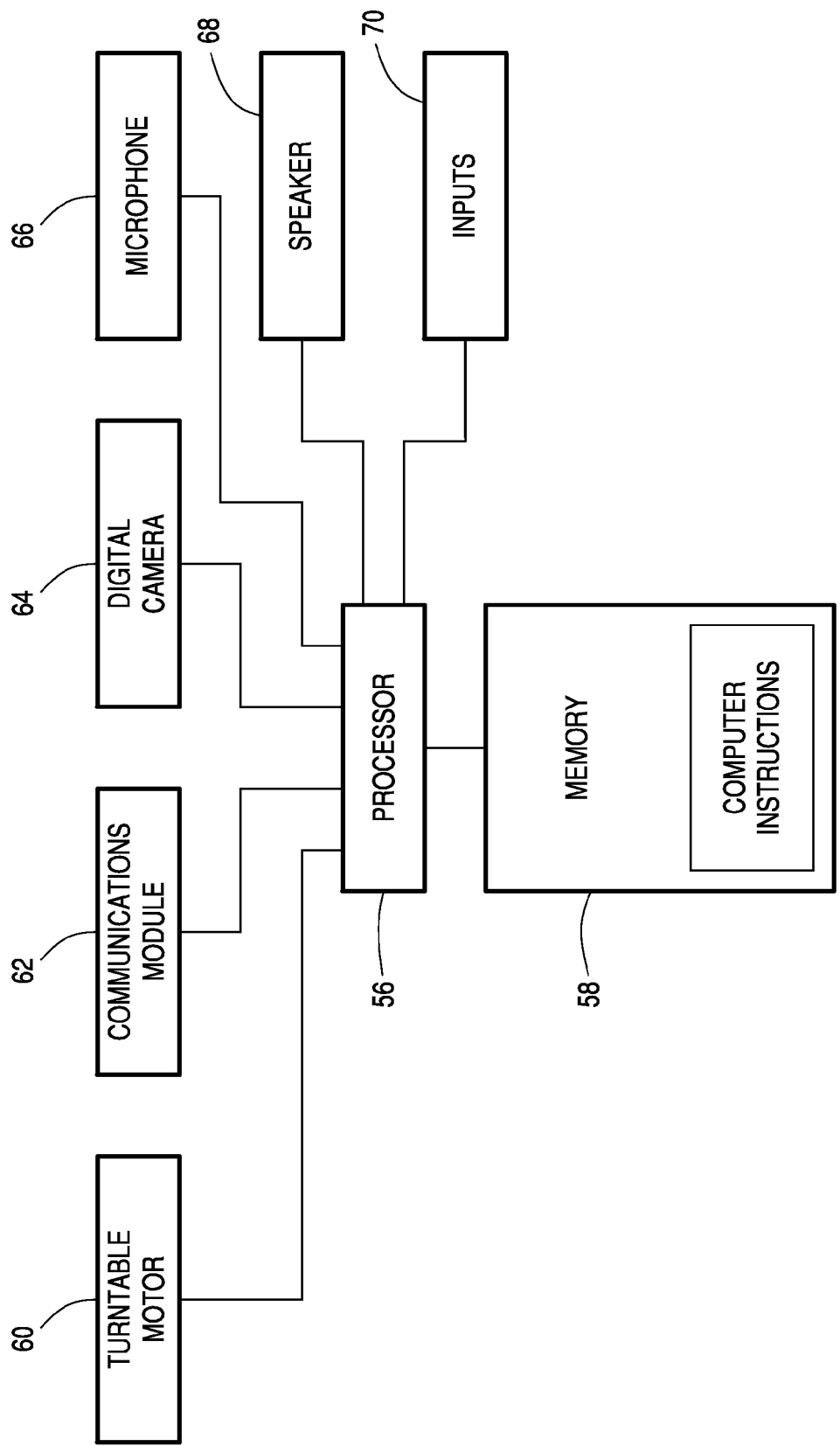
FIG. 13 is a schematic diagram showing the relationship between various components of an automated pet feeder embodiment of the invention.

Various aspects of the invention are further described below with reference to embodiments shown in the appended drawings, as follows. The following reference numerals are used throughout FIGS. 1-12:

10 Internet controlled pet feeder
12 Speaker
14 Speaker
16 Push button
18 Push button
20 Feeding tray turntable
22 Feeder tray turntable control button
24 Voice recording button
26 Feed suspension/resume button
28 Flap
30 Top cover
32 Rubber mount
34 Rubber mount
36 Rubber mount
38 Rubber mount
40 Webcam lens
42 Power connector socket
44 Ethernet cable socket
46 Wired Internet indicator LED
48 Wireless Internet indicator LED
50 Volume control button
52 Feeding tray turntable knob
54 Electronic componentry cover The following reference numerals are used in FIG. 13:

56 Processor
58 Processor-accessible memory
60 Turntable motor
62 Communications module
64 Digital camera
66 Microphone
68 Speaker(s)
70 User Inputs Referring now to FIG. 1, there is shown a top view of a feeder embodiment 10 of the invention with speakers 12 and 14 disposed below an array of small apertures formed in the top lip of the lower housing of the apparatus, and two push buttons 16 and 18 to open the feeder.

In more detail, still referring FIG. 1, feeder 10 has a feeding tray turntable 20. There are three buttons, namely a feeder tray turntable control button 22, a voice recording button 24 and a feeding schedule suspension/resume button 26. There is a flap 28 at the back of the feeder 10 and a top cover 30.

In further detail, still referring to the invention of FIG. 1, feeder 10 as shown is sufficiently sized to hold a feeding tray turntable 20 including six compartments which, for example, may each have a volume of eight or approximately eight ounces. The invention also provides that the volume of the compartments may be larger or smaller. The food compartments are circumferentially adjacent to each other and each extends radially, in the manner of flower petals. The feeder tray turntable control button 22, the voice recording button 24 and the feed suspension/resume button 26 are sufficiently sized so that they may be controlled with a light press from one finger. The top cover 30 is sufficiently sized to contain the electronic componentry that controls feeder 10. The dimensions of feeder 10 may, for example, be twenty inches width by sixteen inches depth by three inches height.

The construction details of the embodiment shown in FIG. 1 are that the feeder housing, top cover and turntable may be made from a durable polymer. For example, the feeder housing and top cover may be made of an ABS plastic with either a gloss or matt paint finish and the turntable may be made of polypropylene. Further, the various components of the feeder 10 can be made of different materials.

Figure 2:
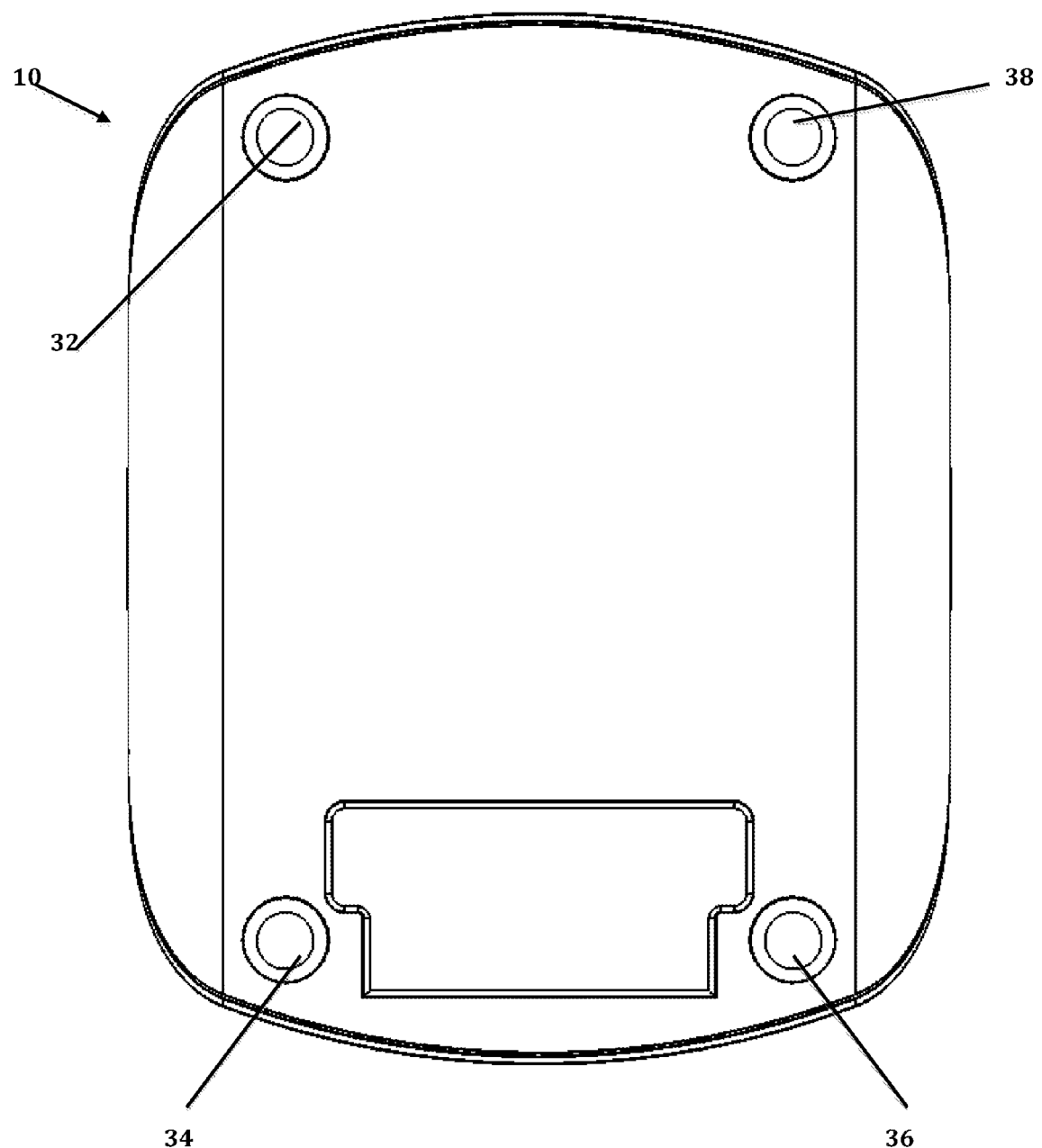
FIG. 2. is a bottom view of the feeder embodiment with its cover in the closed position.

Referring now to FIG. 2, there is shown a bottom view of feeder 10 with four rubber mounts, namely a first rubber mount 32, a second rubber mount 34, a third rubber mount 36 and a fourth rubber mount 38. Rubber mounts 32, 34, 36 and 38 are sufficiently sized to provide a stable platform on the floor for feeder 10. The rubber mounts may be made of a sufficiently strong and rigid rubber, for example, either natural or synthetic rubber.

Figure 3:
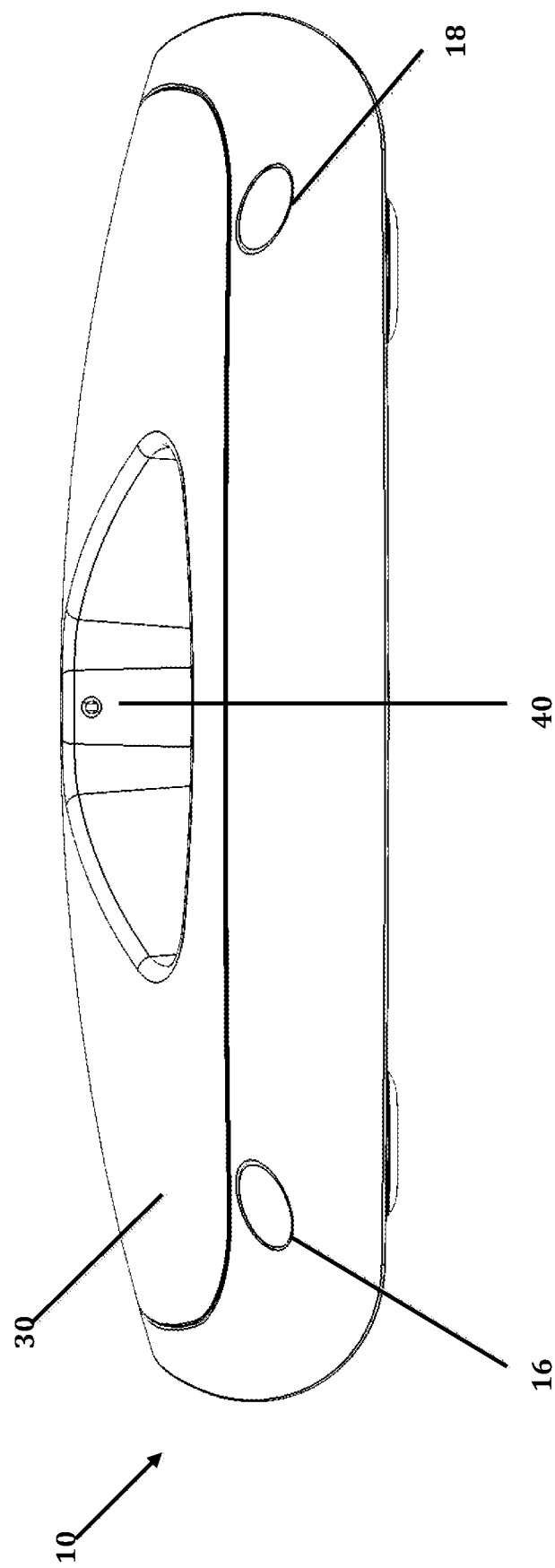
FIG. 3. is a front view of the feeder embodiment with its cover in the closed position.

Referring now to FIG. 3, there is shown a front view of feeder 10 with two push buttons 16 and 18. Further shown is top cover 30 having an integral webcam (digital camera) with outward-facing webcam lens 40. Buttons 16 and 18 are pressed to open top cover 30. Those skilled in the art will appreciate that many kinds of latch mechanisms that are resistant to opening by pets may be used to reversibly secure the top cover to the lower housing. Webcam lens 40 may be sufficiently sized and configured to allow the user (pet owner) to view a substantial area of the room in which the feeder 10 is placed. The webcam lens may be configured to provide a looking-upwards view. As shown in FIG. 3, the webcam lens may be disposed in the "tubular" portion of the top cover that extends downward from its top surface. A webcam may alternatively be disposed, for example, elsewhere on the exterior face of the top cover or elsewhere on the pet feeder. A pet feeder according to the invention may include one or more webcams. In one variation, at least one webcam of the pet feeder has a field of view, when the top cover is closed, that includes the food compartment beneath the feeding aperture of the top cover so that the amount of food remaining in the food compartment can be visually evaluated by a user (pet owner) using the camera.

Push buttons 16 and 18 may be made from a synthetic polymer, such as an ABS plastic, with either a gloss or matt paint finish. The webcam lens 40 may be made from glass or other suitable lens material known in the art.

Figure 4:
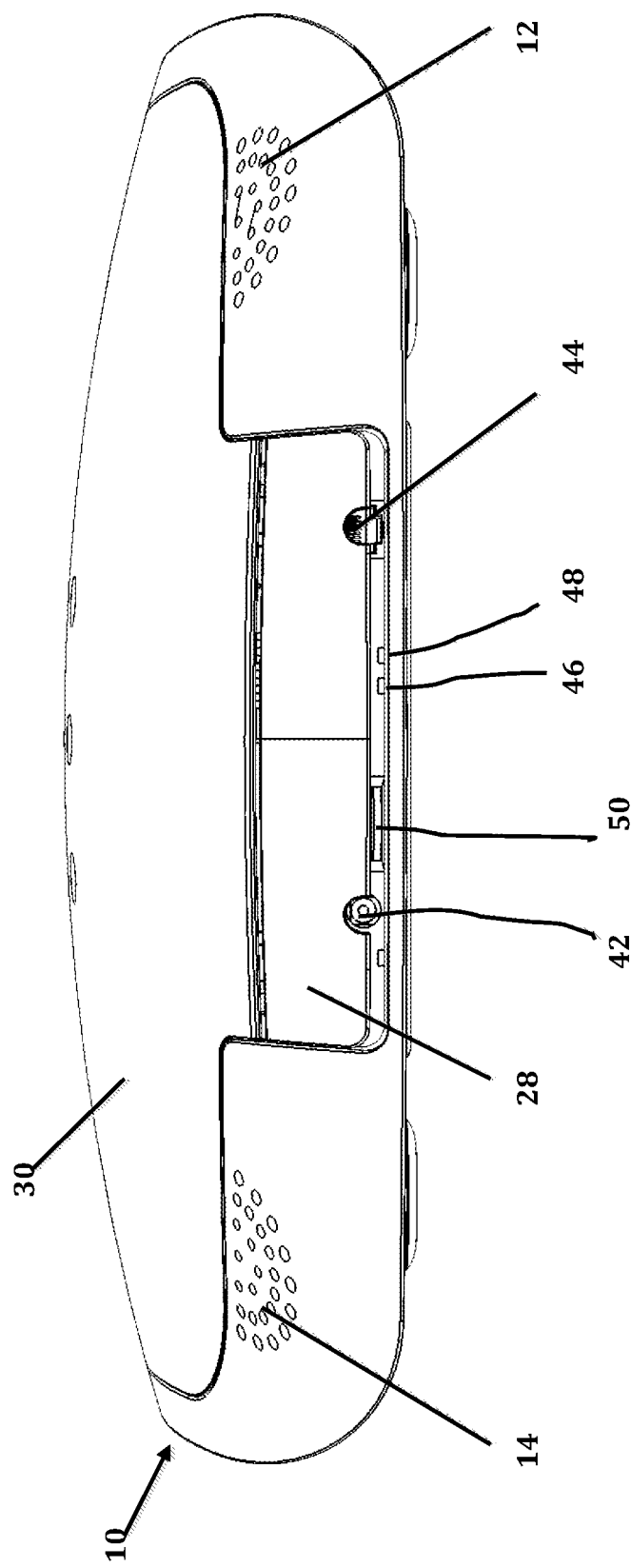
FIG. 4. is a back view of the feeder embodiment with its cover in the closed position.

Referring now to FIG. 4, there is shown a rear view of feeder 10, a flap 28, a power connector socket 42, an Ethernet connector socket 44, a wired Internet connection indicator LED 46, a Wireless Internet connection indicator LED 48 and a speaker volume control dial (wheel) 50.

In more detail, still referring to FIG. 4, flap 28 is sufficiently sized to protect the componentry in the rear of the feeder 10 from being exposed. The power connector socket 42 is sufficiently sized to accommodate a power adaptor from a standard DC power supply and the Ethernet connector socket 44 is sufficiently sized to accommodate a standard Ethernet cable plug. Automated pet feeder embodiments of the invention may also be battery powered, for example, having both a power connector socket and battery chamber. Such devices may, for example, be configured to run on battery power if power supplied from a power cord is interrupted.

Flap 28 may, for example, be made from a synthetic polymer, such as an ABS plastic, with either a gloss or a matt finish. Further, the various other components as shown in FIG. 4 may be made from different materials.

Figure 5:
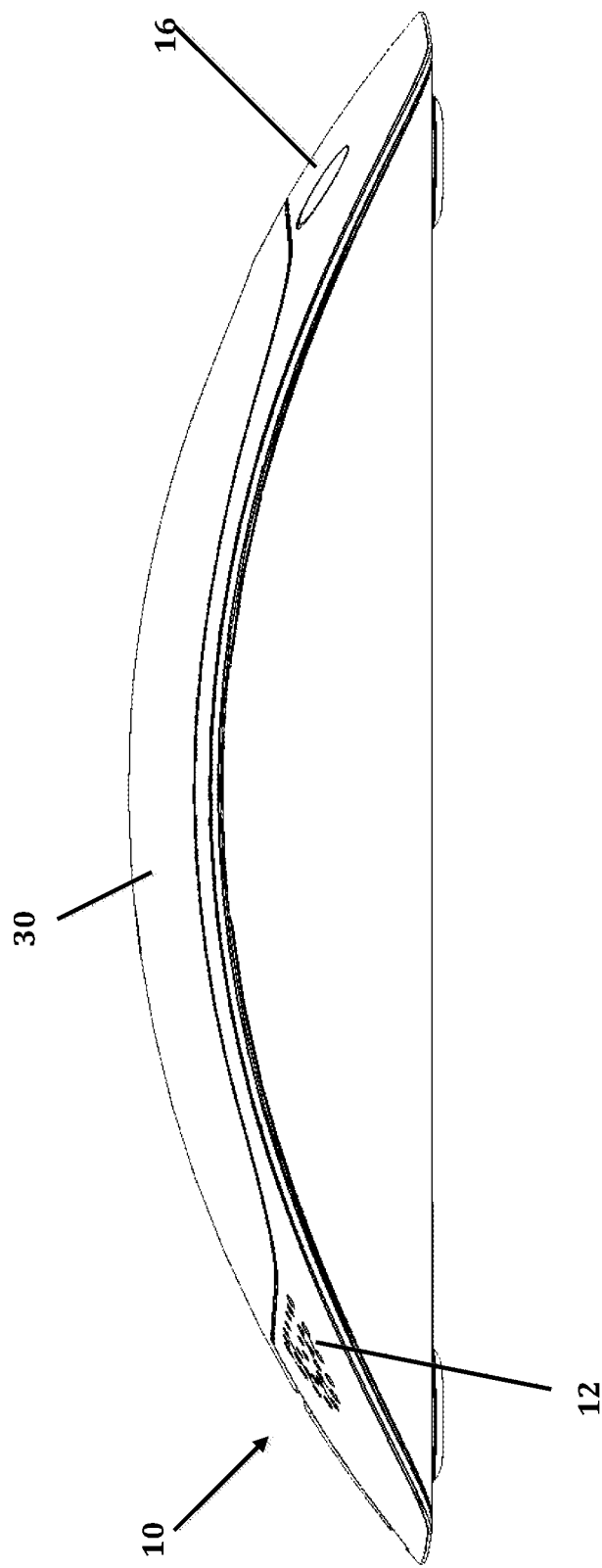
FIG. 5. is a side view of the feeder embodiment with its cover in the closed position.

Referring now to FIG. 5, there is shown a side view of the feeder 10 showing top cover 30, a push button 16 and a speaker 12. The exterior of top cover 30 is convex, as is the overall profile of the top of feeder 10 including the cover when top cover 30 is in the closed position. Such a curvature facilitates runoff of liquids and prevents mishandling of the feeder by the pets. As shown in the accompanying figures, the feeders may have a positive and high aspect ratio (ratio of horizontal dimension to height). Such embodiments have a low center of gravity which prevents pets from toppling the feeder.

Figure 6:
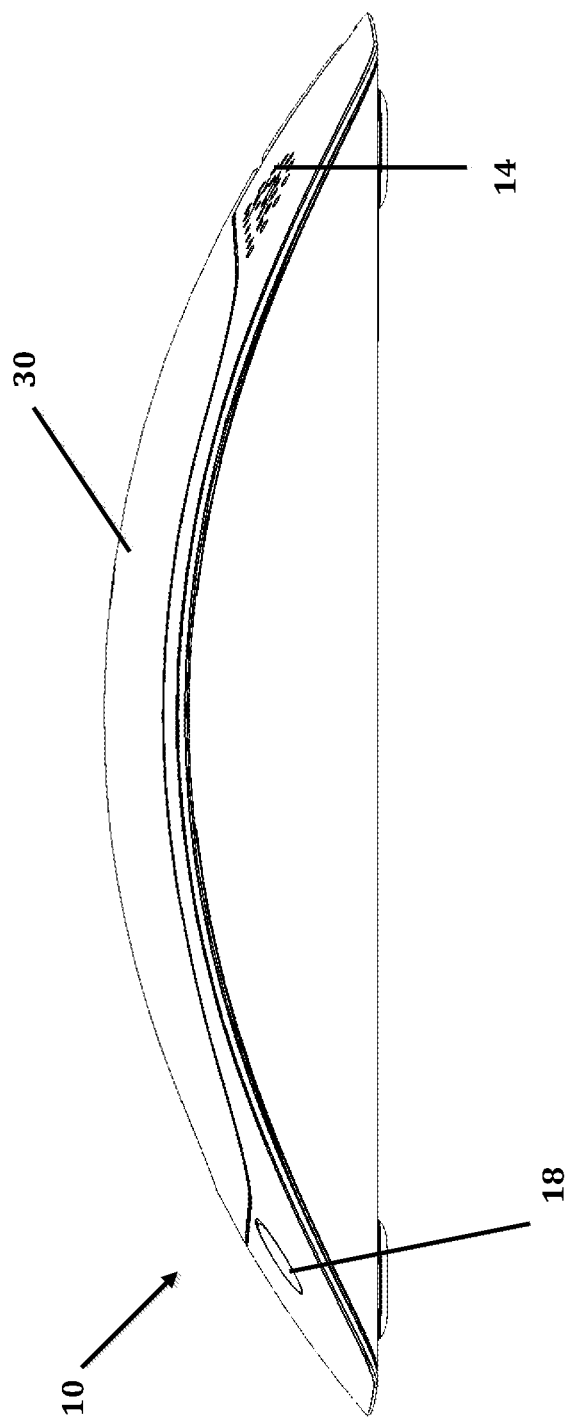
FIG. 6. is a side view of the feeder embodiment with its cover in the closed position.

Referring now FIG. 6, there is shown a side view of the feeder 10 (the opposite side as that shown in FIG. 5) showing top cover 30, a push button 18 and a speaker 14.

Figure 7:
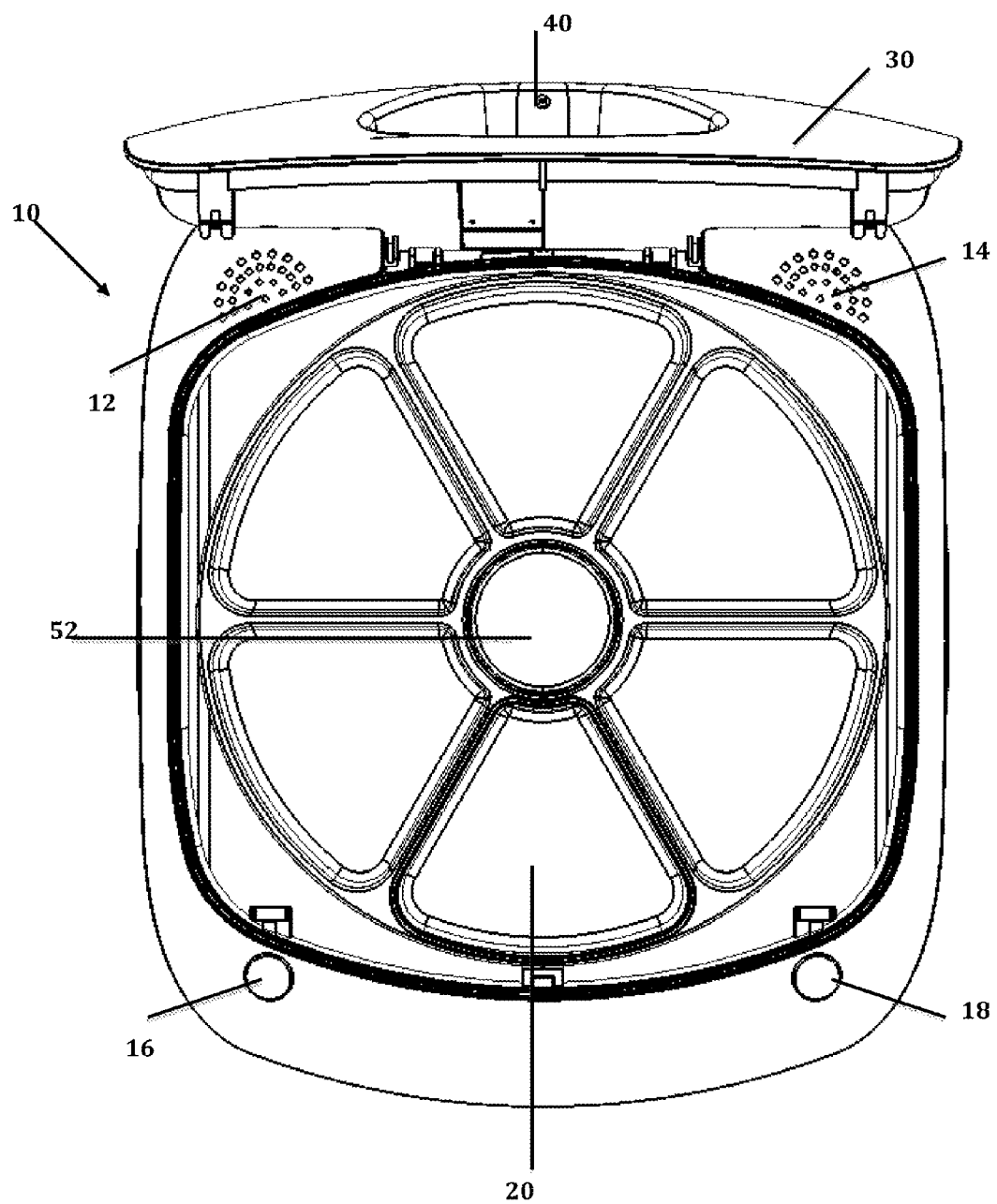
FIG. 7. is a top view of the feeder embodiment with its cover in the open position.

Referring now to FIG. 7, there is shown a top view of the feeder 10 with a top cover 30 in an open position. In more detail, still referring to FIG. 7, there is shown a feeding tray turntable 20, a feeding tray turntable knob 52, and two push buttons 16 and 18. Speakers 12 and 14 are also shown. In further detail, the feeding tray turntable is sufficiently sized to hold six, eight-ounce-cup sized food portions. Turntable knob 52 may be an integral part of feeding turntable 20 and the underside of knob 52 (not shown) may be sized and configured to engage a turntable coupling member of the feeder apparatus, for example in a hexagonal prong and socket configuration. In a different variation, feeding tray turntable knob 52 may be a separate internally threaded member that engages with an underlying outwardly threaded shaft of the lower housing to secure feeding turntable tray 20 in its operative position. As shown, feeding tray turntable knob 52 is of sufficient size to be held by hand to remove the feeding tray turntable 20. Feeding tray turntable 20 and the feeding tray turntable knob 52 may be made from a synthetic polymer such as polypropylene plastic. Polymers that minimize "cat acne" are desirable.

Now describing further one manner of rotational coupling between the pet feeder and the removable feeding turntable, a gear box system may be securely mounted within the lower housing of the pet feeder apparatus that includes an electric motor mechanically coupled via gears to a hexagonal coupling member that is disposed at the top of the gear box and rotates (via coupling to the motor) in a horizontal plane. In the underside of the feeding tray turntable, below the central knob portion, is formed a corresponding hexagonal socket that mountably engages the hexagonal coupling member when the tray is placed into the lower housing of the pet feeder. The gear box may be enclosed in a gear box housing that is securely mounted in the lower housing of the pet feeder apparatus with the hexagonal rotating member presented at the top of the gear box housing. The motor and gear box may be configured so that the feeding tray turntable only turns in one direction.

Figure 8:
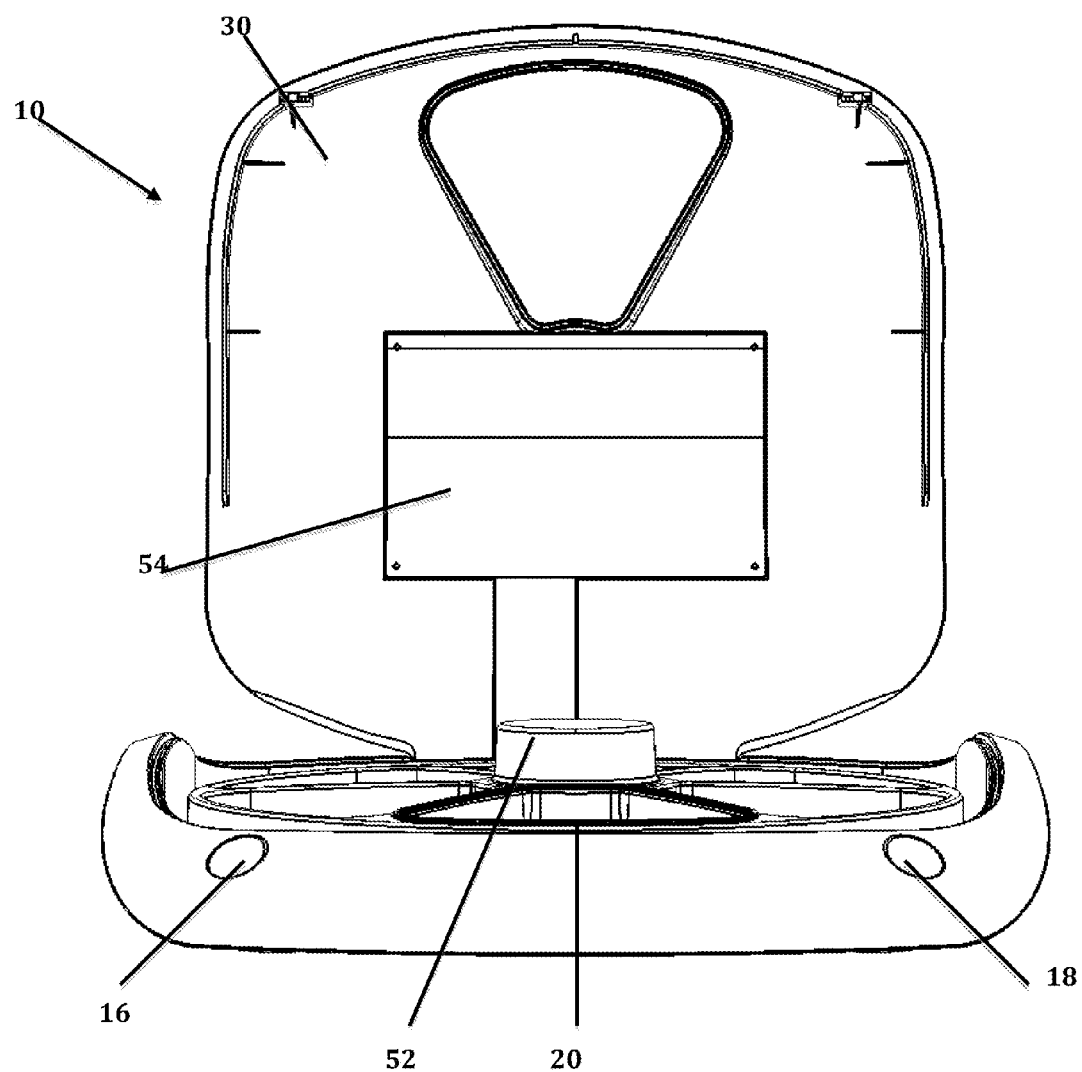
FIG. 8. is a front view of the feeder embodiment with its cover in the open position.
Figure 9:
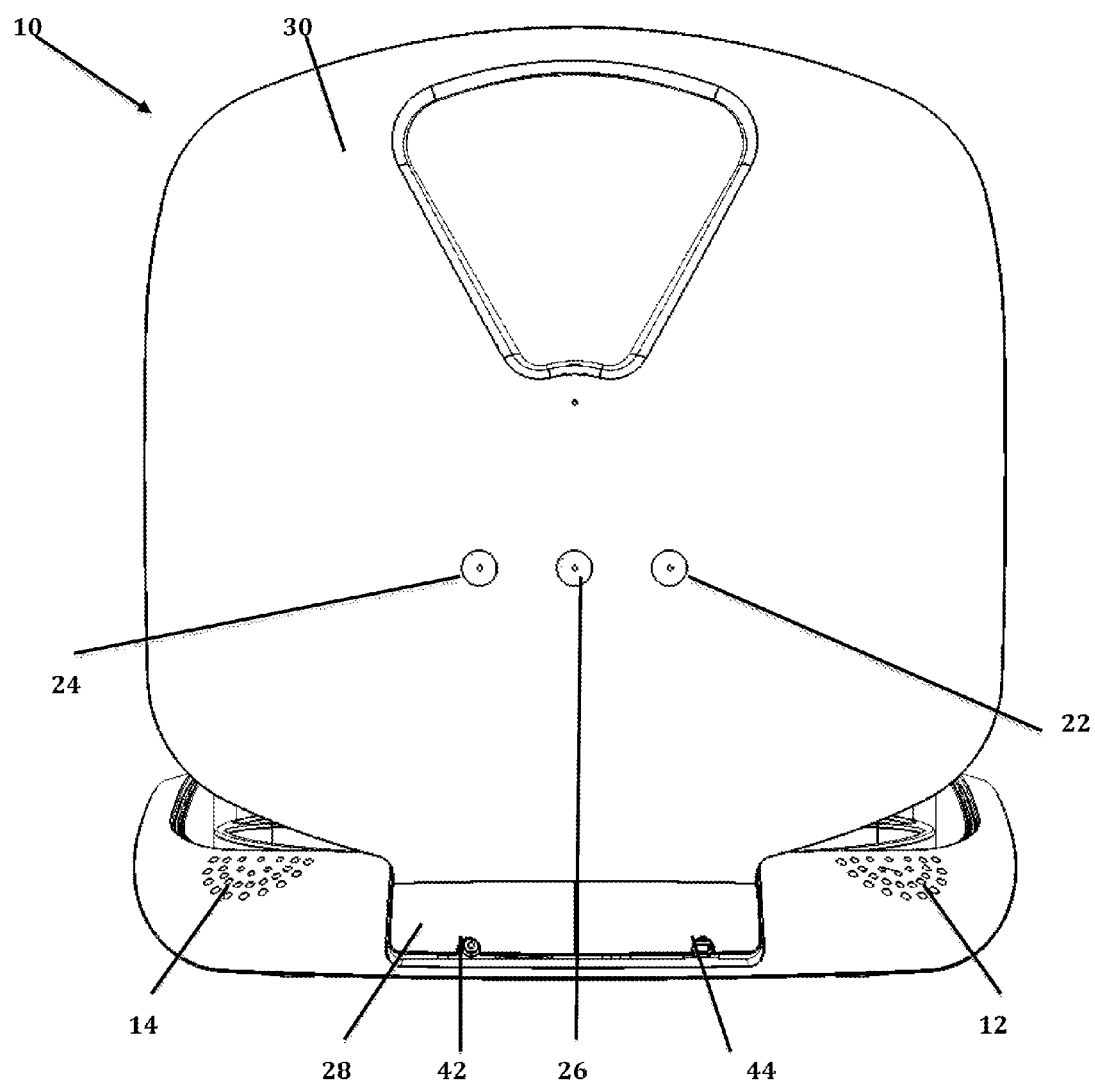
FIG. 9. is a back view of the feeder embodiment with its cover in the open position.
Figure 10:
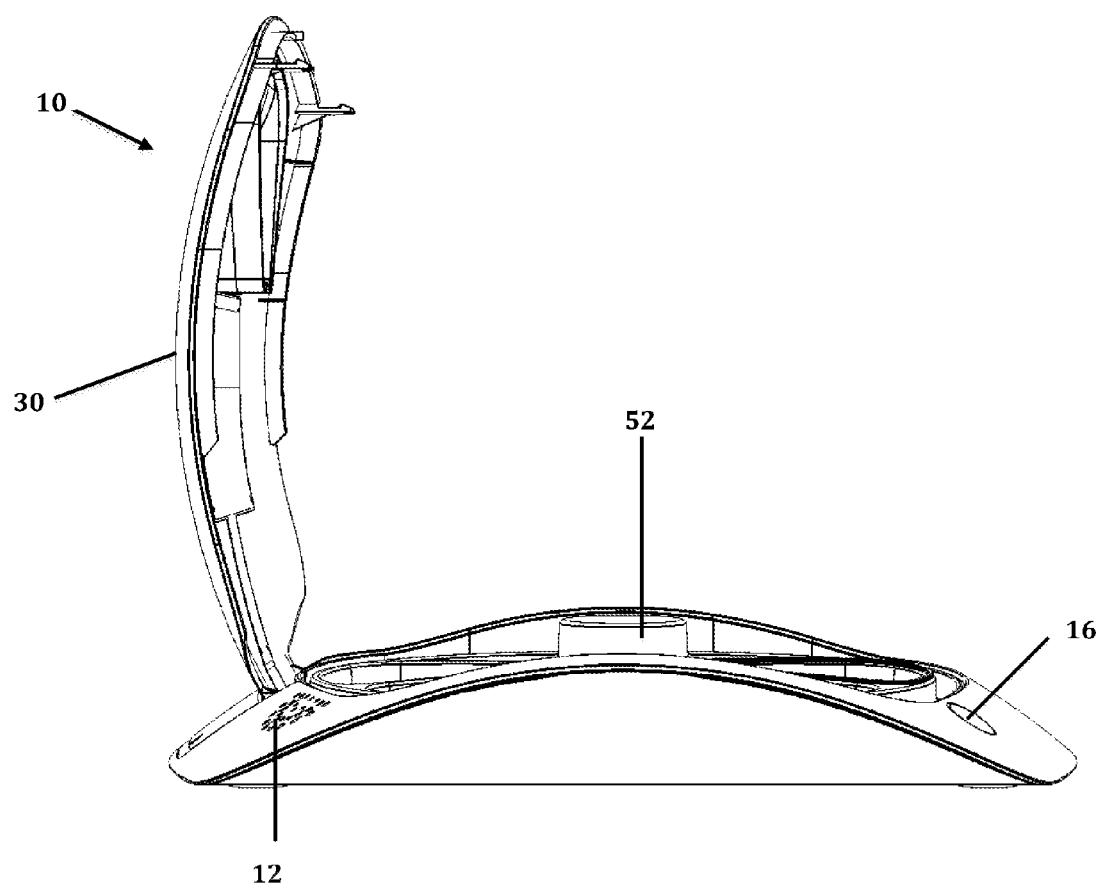
FIG. 10. is a side view of the feeder embodiment with its cover in the open position.
Figure 11:
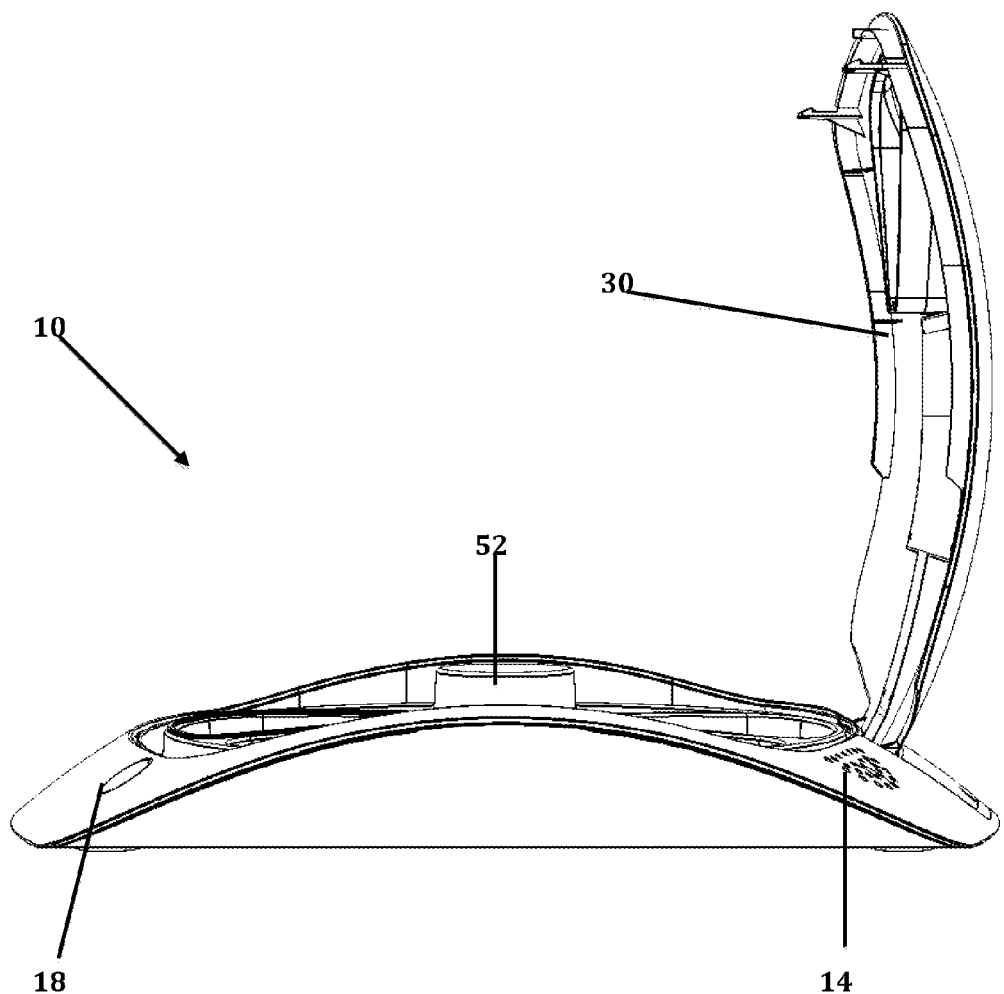
FIG. 11. is a side view of the feeder embodiment with its cover in the open position.
Figure 12:
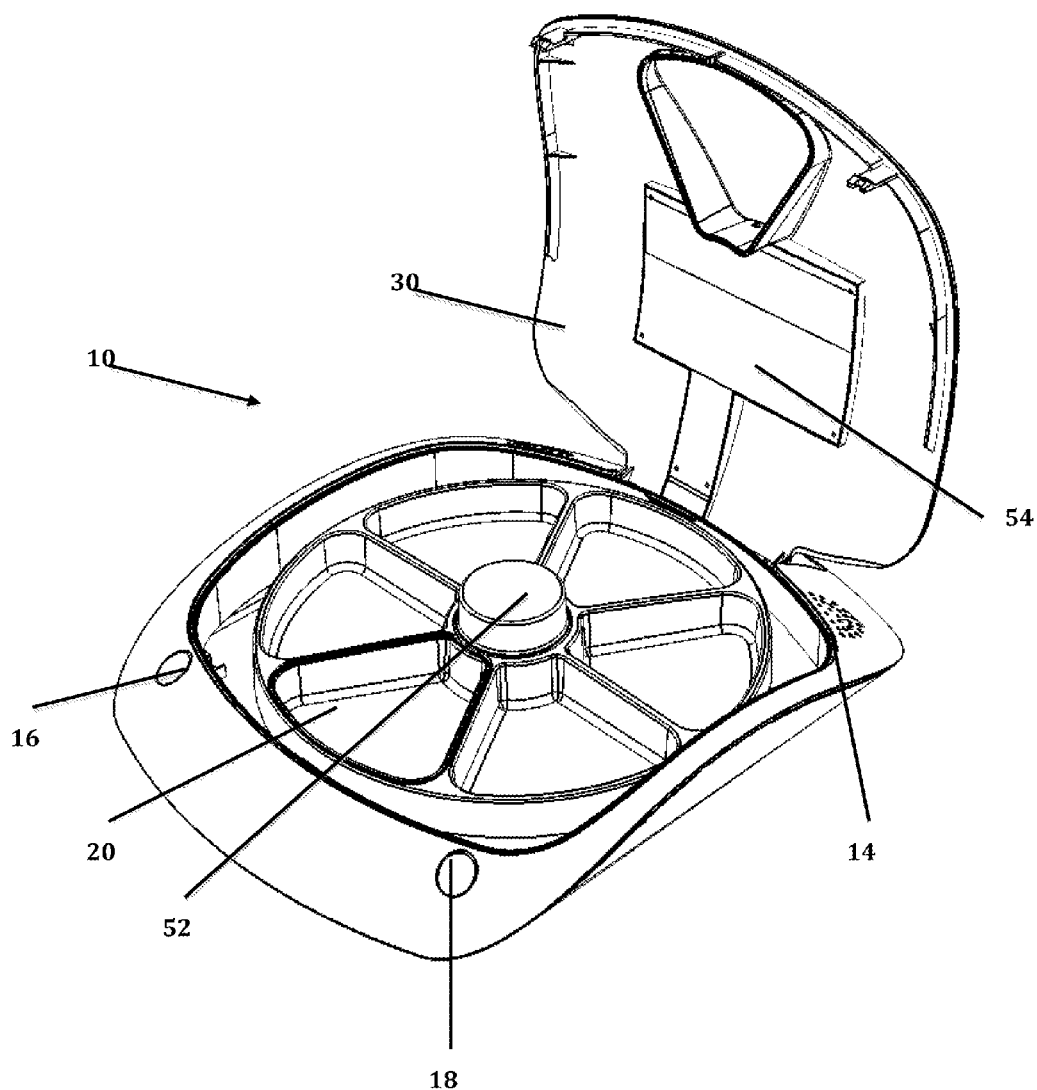
FIG. 12. is a perspective view of the feeder embodiment with its cover in the open position.

Referring now to FIG. 8, there is shown a front view of feeder 10 with top cover 30 in an open position. In more detail, push buttons 16 and 18 are again shown. Also shown are feeding tray turntable 20, feeding tray turntable knob 52 and an electronics componentry cover 54 under which various electronic componentry of the feeder is disposed. In further detail, still referring to FIG. 8, electronics cover 54 has a profile that is of a sufficient size to cover the space to enclose the electronics componentry that controls feeder 10. Componentry cover 54 may be made from a sufficiently high strength plastic material so as to protect the electronics componentry housed beneath it.

FIGS. 9 to 12 show various additional views of feeder 10 with cover 30 in an open position.

FIG. 13 is a schematic diagram showing the relationship of different components of an automated pet feeding apparatus embodiment of the invention. The embodiment includes a processor 56 operably connected to processor-accessible memory 58. Processor-accessible memory 58 includes processor-implementable computer instructions. Turntable motor 60 is provided under control of processor 58. Turntable motor 60 is mechanically linked to the feeding turntable (not shown) so that the turntable may be advanced under control of processor 56 to sequentially expose food compartments beneath the feeding aperture of the housing (not shown) at programmed time intervals or times. The embodiment also includes a communications module that may provide one or more of Wi-Fi connectability to the Internet, a wired Ethernet connection to the Internet, a USB connection for communication with a personal computer or computing device, and a cellular telephone network connection. The embodiment further includes a digital camera 64 operably linked to processor 56 so that the apparatus may transmit images via communications module 62. The embodiment further includes a microphone 66 operably linked to processor 56. Audio captured using microphone 56 may be transmitted via communications module 62 along with images such as video images captured by digital camera 64. The embodiment further includes one or more speakers 68 operably linked to the processor. The speakers may, for example, be used to play audio being received via the communications module from a pet owner via the Internet or a cell phone connection and/or audio prerecorded at the location of the apparatus using microphone 66. The embodiment also includes one or more input/control devices 70 operably linked to processor 56. The input controls may include one or more buttons, dials, etc., the operation of which causes the processor to carry out or not carry out various operations such as recording an audio message via microphone 66 in memory 58 for later playback and resetting such a message, suspending and activating the scheduled operation of the feeding turntable, advancing the turntable to the next feeding compartment position, and resetting and/or initiating a Wi-Fi connection configuration. Control buttons and top cover release buttons may be recessed from the surface of the pet feeder and/or of a small size to inhibit operation of the buttons by the pets.

The Wi-Fi communications module employed with Wi-Fi-enabled embodiments of the invention may, for example, be configurable to connect with a particular Wi-Fi network by using a personal computer or computing device such as a smart phone temporarily connected, e.g., via a USB port or SoftAP, to the automated pet feeding apparatus, and/or via WPS (Wi-Fi Protected Setup protocol) in which a WPS button on the feeding apparatus is first pressed followed by pressing the WPS button on a WPS-enabled wireless router within a required time-frame to automatically establish the wireless network connection), as known in the art.

It should be understood that various conventional hardware components and circuitry may be employed in making embodiments of the invention, such as amplifiers used in connection with the microphone and speakers, microcontrollers and/or other control circuitry for motor operation, a clock microcircuit, etc. Further, various functional units of the invention, such as those shown in FIG. 13, may be provided by a single component or integrated circuit. Conversely, various functions may be distributed among multiple components, modules or units.

Advantages of communications-enabled embodiments of the present invention include, without limitation, that they can be placed anywhere a communications network connection, such as an Internet connection, is available. Further, they allow pet owners to control and regulate their pet's feeding habits by scheduling feeding times over the Internet (or other communications network, such as cellular phone network), therefore ensuring that their pet gets fed at regular schedules. Still further, such embodiments allow pet owners to remotely check that their pets are eating and/or remotely check on the general welfare of their pet via the built in webcam.

The invention also provides that any of the feeder embodiments of the invention may be further provided with and include a cooling/refrigeration unit that keeps the food contents of the feeding compartments at a cool temperature. For example, an on-board refrigeration unit could circulate cooled air within the feeder on the bottom side of the feeding tray to cool its contents. Those skilled in the art will appreciate that many kinds of cooling and refrigeration devices/apparatuses and methods are readily adaptable for use with embodiments of the present invention. Such cooling/refrigeration units may be electrically powered, as known in the art.

Although the foregoing description is directed to the preferred embodiments of the invention, other variations and modifications may be made without departing from the spirit or scope of the invention. Moreover, features described in connection with one embodiment of the invention may be used in conjunction with other embodiments, even if not explicitly stated above.

What is claimed is:

1. A multi-meal, automated pet feeding apparatus, comprising:
    a lower housing forming a partial enclosure comprising a bottom, a vertically extending side wall or walls with an expansive top aperture opening into the interior of the lower housing;
    a feeding turntable comprising a plurality of circumferentially adjacent, radially aligned, horizontally expansive food compartments each bounded by a bottom surface and side walls and open at its top, the turntable rotatably mounted and rotatable within the horizontal dimension of the lower housing; and
    a reversibly closable horizontally expansive top cover having an outward-facing top surface and an inward-facing bottom surface and a feeding aperture formed therethrough,
    wherein the top cover and the lower housing are mutually sized and configured so that when the top cover is closed it covers the top aperture formed in the lower housing except for the portion of said top aperture that is below the feeding aperture of the top cover,
    wherein the feeding aperture and the food compartments are mutually sized and configured so that the feeding aperture is capable of providing access to only a single underlying food compartment at one time, and
    wherein the horizontal dimension of the top aperture of the lower housing is larger than the horizontal dimension of the feeding turntable.

2. The pet feeding apparatus of claim 1, wherein the size and shape of the horizontal profile of the feeding aperture is at least substantially the same as the size and shape of each of the horizontal profiles of the food compartments.

3. The pet feeding apparatus of claim 2, wherein the top cover is hingeably attached to the lower housing.

4. The pet feeding apparatus of claim 2, further comprising:
    a motorized mechanism operably configured to rotate the turntable.

5. The pet feeding apparatus of claim 2, wherein
    the feeding aperture is bounded by downward-extending side walls having bottom edges; and
    the lower housing, feeding turntable and top cover are mutually sized and configured so that when the top cover is closed, the top edges of the side walls of the food compartments are in close proximity to the bottom edges of the downward-extending side walls.

6. The pet feeding apparatus of claim 1, wherein the top cover is hingeably attached to the lower housing.

7. The pet feeding apparatus of claim 1, further comprising:
    a motorized mechanism operably configured to rotate the turntable.

8. The pet feeding apparatus of claim 1, wherein the feeding turntable is removable.

9. The pet feeding apparatus of claim 1, wherein
    the feeding aperture is bounded by downward-extending side walls having bottom edges; and
    the lower housing, feeding turntable and top cover are mutually sized and configured so that when the top cover is closed, the top edges of the side walls of the food compartments are in close proximity to the bottom edges of the downward-extending side walls.

10. The pet feeding apparatus of claim 1, further comprising:
    a processor;
    processor-accessible memory;
    processor-implementable computer instructions stored in the processor-accessible memory;
    a motorized mechanism configured to rotate the feeding turntable; and
    a communications module operably linked to the processor,
    wherein operation of the motorized mechanism to rotate the feeding turntable is under control of the processor,
    wherein the computer instructions are configured to direct the processor to operate the motorized mechanism to rotate the turntable at preprogrammed time intervals or times to position different feeding compartments under the feeding aperture at the preprogrammed time intervals or times, and
    wherein the computer instructions are further configured to direct the processor to receive, store and implement, time programming instructions for operation of the turntable that are received via the communications module.

11. The pet feeding apparatus of claim 10, further comprising: a cooling apparatus.

12. A multi-meal, automated pet feeding apparatus, comprising:
    a lower housing forming a partial enclosure comprising a bottom, a vertically extending side wall or walls with an expansive top aperture opening into the interior of the lower housing;
    a feeding turntable comprising a plurality of circumferentially adjacent, radially aligned, horizontally expansive food compartments each bounded by a bottom surface and side walls and open at its top, the turntable rotatably mounted and rotatable within the horizontal dimension of the lower housing; and
    a reversibly closable horizontally expansive top cover having an outward-facing top surface and an inward-facing bottom surface and a feeding aperture formed therethrough,
    wherein the top cover and the lower housing are mutually sized and configured so that when the top cover is closed it covers the top aperture formed in the lower housing except for the portion of said top aperture that is below the feeding aperture of the top cover,
    wherein the feeding aperture and the food compartments are mutually sized and configured so that the feeding aperture is capable of providing access to only a single underlying food compartment at one time, wherein the feeding aperture is bounded by downward-extending side walls having bottom edges, and wherein the lower housing, feeding turntable and top cover are mutually sized and configured so that when the top cover is closed, the top edges of the side walls of the food compartments slideably contact the bottom edges of the downward-extending side walls.

13. The pet feeding apparatus of claim 12, further comprising:

a processor;

processor-accessible memory;

processor-implementable computer instructions stored in the processor-accessible memory; and a motorized mechanism configured to rotate the feeding turntable, wherein operation of the motorized mechanism to rotate the turntable is under control of the processor, and wherein the computer instructions are configured to direct the processor to operate the motorized mechanism to rotate the turntable at preprogrammed time intervals or times to position different feeding compartments under the feeding aperture of the top cover in its closed position at the preprogrammed time intervals or times.

14. The pet feeding apparatus of claim 13, further comprising:

a communications module operably linked to the processor, wherein the computer instructions are further configured to direct the processor to receive, store and implement, time programming instructions for operation of the turntable that are received via the communications module.

15. A multi-meal, automated pet feeding apparatus comprising:

a lower housing forming a partial enclosure comprising a bottom, a vertically extending side wall or walls with an expansive top aperture opening into the interior of the lower housing;

a feeding turntable comprising a plurality of circumferentially adjacent, radially aligned, horizontally expansive food compartments each bounded by a bottom surface and side walls and open at its top, the turntable rotatably mounted and rotatable within the horizontal dimension of the lower housing; and a reversibly closable horizontally expansive top cover having an outward-facing top surface and an inward-facing bottom surface and a feeding aperture formed therethrough, wherein the top cover and the lower housing are mutually sized and configured so that when the top cover is closed it covers the top aperture formed in the lower housing except for the portion of said top aperture that is below the feeding aperture of the top cover, wherein the feeding aperture and the food compartments are mutually sized and configured so that the feeding aperture is capable of providing access to only a single underlying food compartment at one time, wherein the feeding aperture is bounded by downward-extending side walls having bottom edges, wherein the lower housing, feeding turntable and top cover are mutually sized and configured so that when the top cover is closed, the top edges of the side walls of the food compartments slideably contact the bottom edges of the downward-extending side walls, and wherein the size and shape of the horizontal profile of the feeding aperture is at least substantially the same as the size and shape of each of the horizontal profiles of the food compartments.

16. The pet feeding apparatus of claim 15, further comprising:

a processor;

processor-accessible memory;

processor-implementable computer instructions stored in the processor-accessible memory;

a motorized mechanism configured to rotate the feeding turntable; and a communications module operably linked to the processor, wherein operation of the motorized mechanism to rotate the feeding turntable is under control of the processor, wherein the computer instructions are configured to direct the processor to operate the motorized mechanism to rotate the turntable at preprogrammed time intervals or times to position different feeding compartments under the feeding aperture at the preprogrammed time intervals or times, and wherein the computer instructions are further configured to direct the processor to receive, store and implement, time programming instructions for operation of the turntable that are received via the communications module.

17. A multi-meal, automated pet feeding apparatus, comprising:

a lower housing forming a partial enclosure comprising a bottom, a vertically extending side wall or walls with an expansive top aperture opening into the interior of the lower housing;

a feeding turntable comprising a plurality of circumferentially adjacent, radially aligned, horizontally expansive food compartments each bounded by a bottom surface and side walls and open at its top, the turntable rotatably mounted and rotatable within the horizontal dimension of the lower housing; and a reversibly closable horizontally expansive top cover having an outward-facing top surface and an inward-facing bottom surface and a feeding aperture formed therethrough;

a processor;

processor-accessible memory;

processor-implementable computer instructions stored in the processor-accessible memory;

a motorized mechanism configured to rotate the feeding turntable;

a communications module operably linked to the processor; and an outward-viewing digital camera operably linked to the processor, wherein operation of the motorized mechanism to rotate the turntable is under control of the processor, wherein the computer instructions are configured to direct the processor to operate the motorized mechanism to rotate the turntable at preprogrammed time intervals or times to position different feeding compartments under the feeding aperture of the to cover in its closed position at the preprogrammed time intervals or times, wherein the computer instructions are further configured to direct the processor to receive, store and implement, time programming instructions for operation of the turntable that are received via the communications module, wherein the computer instructions are further configured to direct the processor to transmit digital images obtained using the digital camera via the communications module, wherein the top cover and the lower housing are mutually sized and configured so that when the top cover is closed it covers the top aperture formed in the lower housing except for the portion of said top aperture that is below the feeding aperture of the top cover, and wherein the feeding aperture and the food compartments are mutually sized and configured so that the feeding aperture is capable of providing access to only a single underlying food compartment at one time.

18. The pet feeding apparatus of claim 17, wherein the communications module comprises a wireless communications module.

19. The pet feeding apparatus of claim 18, wherein the wireless communications module is selected from the group consisting of a Wi-Fi module and a cellular telephone module.

20. The pet feeding apparatus of claim 17, wherein the digital camera is integrated with the top cover.

21. The pet feeding apparatus of claim 17, further comprising:

a microphone operably linked to the processor, wherein the computer instructions are further configured to direct the processor to transmit audio data obtained using the microphone via the communications module.

22. The pet feeding apparatus of claim 17, further comprising:

a speaker operably linked to the processor, wherein the computer instructions are further configured to direct the processor to operate the speaker to play an audio segment recorded in the processor-accessible memory.

23. The pet feeding apparatus of claim 17, further comprising:

a microphone operably linked to the processor; and a speaker operably linked to the processor, wherein the computer instructions are further configured to direct the processor to store an audio segment obtained using the microphone in the processor-accessible memory and thereafter operate the speaker to play the recorded audio segment.

24. The pet feeding apparatus of claim 17, further comprising:

a speaker operably linked to the processor, wherein the computer instructions are further configured to direct the processor to operate the speaker to play audio received from a remote user via the communications module.

* * * * *